Dec. 25, 1951     E. W. BULLARD     2,580,280
TELESCOPE SIGHT
Filed Jan. 4, 1949
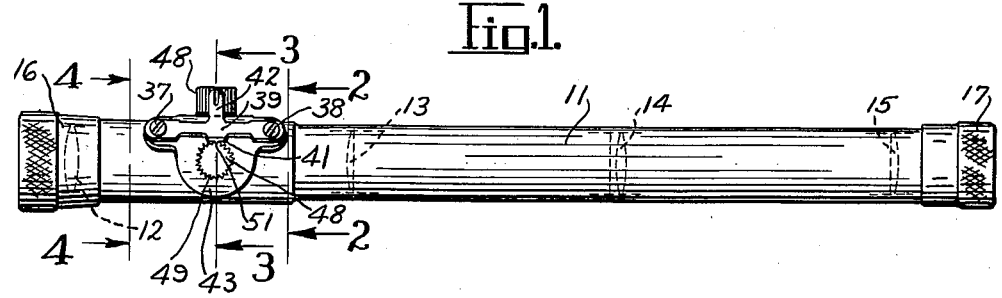
  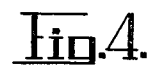
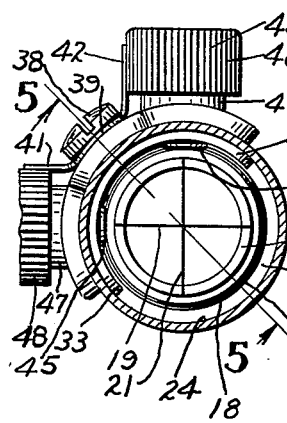 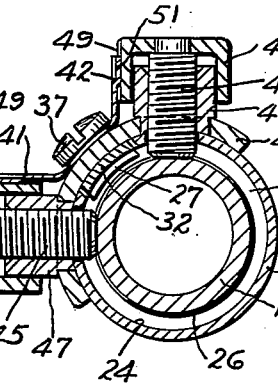 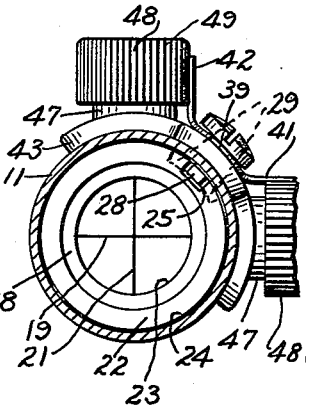
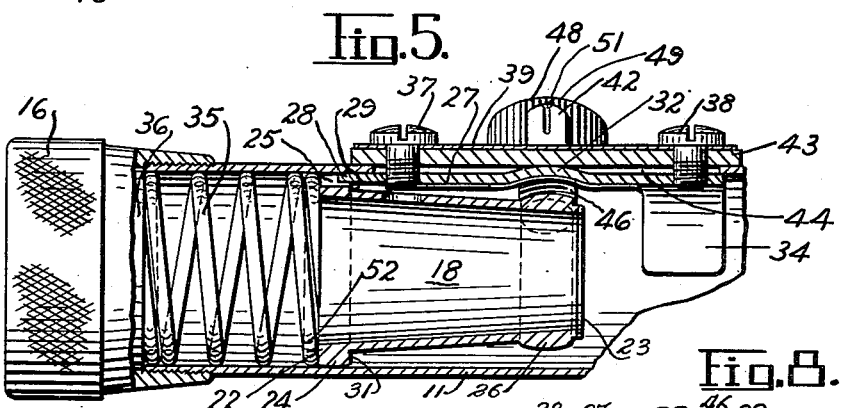
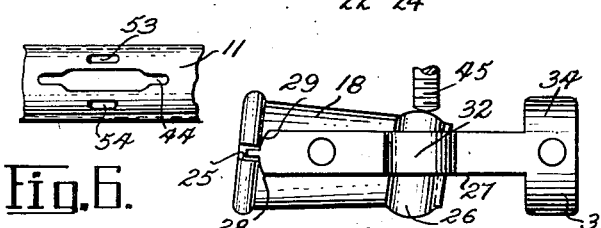 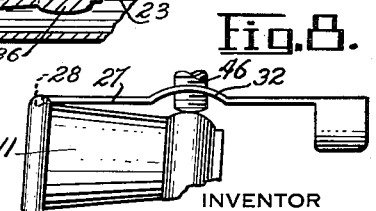
INVENTOR
*Edwin W. Bullard.*
BY
*Walter S. Edwards,*
ATTORNEY Patented Dec. 25, 1951

2,580,280

UNITED STATES PATENT OFFICE 2,580,280

TELESCOPE SIGHT

Edwin W. Bullard, Hamden, Conn., assignor to
O. F. Mossberg & Sons, Inc., New Haven, Conn.,
a corporation of Connecticut Application January 4, 1949, Serial No. 69,090

10 Claims. (Cl. 33—50)

1

This invention relates to telescope sights particularly for use with firearms for sighting purposes.

Telescope sights for use with firearms require various adjustments to suit them for efficient use under varying conditions. For instance, telescope sights for use with firearms are usually provided with a reticule including cross-hairs, and which requires adjustment laterally to compensate for deviations in wind velocity and directions, and also for differences in the length of the range, or the distance the target, or object, being sighted is from the firearm, to insure the proper elevation and accurate subsequent operation of the firearm. It is also often desirable to adjust the reticule axially in respect to the lenses contained therein to bring it into sharp relief to suit the focal characteristics of the eye of the user.

One object of this invention is to provide in a telescope sight improved means to adjust the reticule relatively to the lenses of the telescope to suit the focal characteristics of the eye of the user without effecting any lateral adjustment of the reticule.

Another object is to provide in a telescope sight improved means to internally adjust the sighting reticule to suit the requirements caused by deviations in wind velocity, direction, and to suit the elevation requirements caused by deviations in the length of the range.

A further object is to provide an improved telescope sight reticule adjusting mechanism which will be relatively inexpensive to manufacture, simple in construction, compact, of pleasing appearance, and which is very efficient and durable in use.

With these and other objects in view, which will appear as the description proceeds, there has been illustrated in the accompanying drawings one form in which the features and principles of this invention may be conveniently embodied in practice.

In the drawings:

Figure 1 is a side view of a telescope sight embodying the features and principles of this invention;

Figure 2 is an enlarged cross-sectional view taken on the line 2—2 of Figure 1;

Figure 3 is a cross-sectional view taken on the line 3—3 of Figure 1;

Figure 4 is a cross-sectional view taken on the line 4—4 of Figure 1;

Figure 5 is an enlarged lengthwise sectional view taken on the line 5—5 of Figure 2 of the portion of the telescope sight in which the sighting reticule is disposed;

Figure 6 is a top plan view of the portion of the telescope sight tube at which the reticule adjusting means are located; and Figures 7 and 8 are fragmentary views showing

2 further details of the means by which adjustment of the reticule within the sight tube is obtained.

Referring now to the drawings wherein like reference numerals designate like parts throughout the several views, the reference numeral 11 denotes the telescope sight tube, or casing, which is provided with the usually required ocular lense 12 and other lenses 13, 14 and 15 which are suitably spaced apart lengthwise of the tube 11 and are suitably held in their required positions. Caps 16 and 17 are provided one at each end of the tube 11, the cap 16 carrying the ocular lense and being adapted to be screwed onto the rear end of the tube 11.

A hollow sighting reticule 18, in this instance, provided in its forward end with cross hairs 19 and 21 is circular in cross-section and is disposed in the tube 11 spaced forwardly from the ocular lense 12 and cap 16. The reticule 18 is generally frusto-conically shaped and is disposed lengthwise in the tube 11 with its larger diameter end 22 facing toward the cap 16 at the rear end of the tube. The cross-hairs 19 and 21 are secured to the reticule 18 at the smaller diameter end 23. An annular flange 24 of larger diameter than the larger diameter reticule end 22 surrounds the same and is integral therewith. The outer peripheral surface of the flange 24 is arcuate in cross-section lengthwise, the arc being of a radius substantially equal to the radius of the internal periphery of the tube 11 so that the reticule may freely swing in any direction in the tube with the flange 24 constantly bearing on the internal peripheral surface of the tube 11. At one point in its peripheral surface the flange 24 is provided with a narrow slot 25 which extends lengthwise therethrough. An annular rib 26 is integral with and surrounds the reticule 18 adjacent the smaller diameter end 23 thereof. The rib 26 is arcuate in cross-section lengthwise and the arc thereof is struck from a point substantially on the lengthwise axis of the reticule 18. The rib 26 extends out from the external peripheral surface of the reticule and its diameter is slightly more than the diameter of the smaller diameter end of the reticule 18 but is much smaller in diameter than the internal diameter of the tube 11.

A spacer bar 27 is provided to retain the reticule 18 in position within the tube 11. The spacer bar 27 is arcuate in cross-section and the arc of its outer peripheral surface substantially fits the arc of the internal surface of the tube 11. The rear end of the spacer bar 27 is reduced in width to form a tongue 28 adapted to be loosely received in the slot 25 formed in the flange 24 of the reticule 18, and rearwardly directed shoulders 29, one on either side of the tongue 28, are adapted to engage against the forwardly directed face 31 of the flange 24. The spacer bar 27, intermediate its ends and substantially in transverse alignment with the annular rib 26 on the reticule 18, is bowed outwardly as at 32, Figure 5, the arc of the bowed portion 32 being substantially concentric to the arc of the external peripheral surface of the rib 26 and is spaced outwardly therefrom. The front end of the spacer bar 27 is provided with side flaps 33 and 34, as seen in Figures 2 and 5, one extending from each side of the bar and curved about and engaging the internal peripheral surface of the tube 11 to firmly support the bar 27 against peripheral twisting therein.

The reticule 18 is constantly urged toward the spacer bar 27 to maintain its forwardly directed face 31 in firm contact with the shoulders 29 on the bar 27, by a coiled spring 35 which spring is arranged in the tube 11 to react between the larger diameter end 22 of the reticule 18 and an abutment at the rear end of the casing 11 herein comprising the end cap 16, through a lense retaining ring 36. The diameter of the spring 35 is slightly less than the diameter of the tube so that the tube 11 retains the spring against transverse distortion and maintains it in proper position to resist swinging movement of the reticule in any direction with substantially equal pressure.

The spacer bar 27 is secured in and to the tube 11 for adjustment lengthwise of the tube by screws 37 and 38. The screws 37 and 38 pass through the base plate 39 from which the click springs 41 and 42 extend and a reticule adjusting screw base plate 43, to secure these parts and the spacer bar 27 together and to clamp the tube 11 between the base plate 43 and the bar 27. To accomplish this, the screws pass through a lengthwise elongated slot 44 provided in the tube 11. The outwardly bowed portion 32 of the bar 27 extends outwardly into the slot 44 (Figures 3 and 5) and, by contact with its sides, guides the bar 27, together with the base plate 43, during their lengthwise adjusting movements along the tube 11.

Inasmuch as bar 27 is bowed outwardly at 32 and is spaced away from rib 26, it does not interfere with the full rocking movement required of reticule 18.

Adjusting screws 45 and 46 extend from the base plate 43 into the tube 11 through elongated slots 53 and 54 respectively. The screws are located at substantially 90 degrees apart about the periphery of the tube 11, one on either side of the spacer bar 27, and extend thereinto a sufficient amount for their inner ends to engage the periphery of the rib 26. The screws 45 and 46 are screwed through bushings 47 secured to the plate 43 and have inverted cup shaped knobs 48 secured to their outer ends. The peripheral surfaces of the knobs 48 are provided with lengthwise grooves 49. The click springs 41 and 42 are each provided with a rib 51 and are tensioned to press against the knobs 48 whereby turning movement of the knobs 48 will cause a distinct click to be heard as the ribs 51 ride over the surface of the knobs and drop into one of the grooves 49.

By screwing the vertically disposed screw 45 inwardly or outwardly the reticule 18 is swung downwardly or allowed to swing upwardly due to spring tension, respectively. Similarly, by screwing the horizontally disposed screw 46 inwardly or outwardly the reticule will be swung transversely in one direction, or be allowed to swing transversely due to spring tension in the other direction, respectively. In this manner, crosshairs 19 and 21 may be positioned to compensate for differences in length of range and for deviations in wind velocity and direction. The tongue 28 on the spacer bar 27, which fits loosely in the slot 25 of the flange 24, is preferably disposed substantially midway between the adjusting screws 45 and 46 so that the lower portion of the coil 52 of the spring 35 will engage the rear end of the reticule 18 and will act to constantly urge the forward reticule rib 26 against the inner ends of both adjusting screws 45 and 46. The forward end of the reticule is thus constantly urged into abutment with the ends of both of the adjusting screws, so that when either is unscrewed and moved outwardly, the reticule is tipped within the sight tube in a direction substantially transverse to the axis of the latter. Such movement is permitted by the abutting engagement of the reticule faces 31 on shoulders 29 of the spacer bar 27. As shown more particularly in Figures 7 and 8, tongue 29, being loosely disposed in the slot 25, permits the aforesaid required rocking movement of the reticule to occur, while at the same time preventing undue rotation of it within casing 11. The upper portion of the spring 35, being prevented from expanding due to the engagement of its ends with the reticule 18 and the cap 16, firmly, but rockingly holds the face 31 of the reticule against the shoulders 29 on the spacer bar 27.

By loosening the screws 37 and 38, the reticule 18, the spacer bar 27 and the base plate 43 with the adjusting screws 45 and 46 may be moved lengthwise of the tube 11 in either direction to adjust the reticule in respect to the lenses and dispose the cross-hairs 19 and 21 in desired focus with the eye of the user.

By the provision in a telescope sight of the new and useful structural features pointed out above, an improved telescope sight is formed which is particularly efficient and durable in use and comparatively simple and inexpensive to manufacture. The reticule adjusting means of this invention is particularly useful in telescope sights, being readily adjusted to focus the crosshairs, for deviations in wind conditions, and for differences in length of range, while mounted on a firearm.

While there has been shown and described herein a preferred form in which the features and principles of this invention may be embodied, it will be understood that the same may be embodied in other specific forms without departing from the spirit and essential attributes thereof, and it is therefore desired that the present embodiment be considered in all respects as illustrative and not restrictive, reference being had to the claims rather than to the foregoing description to indicate the scope of the invention.

Having thus fully disclosed the invention, what is claimed as new and for which it is desired to secure Letters Patent, is:

1. In a telescope sight, a tubular casing, a tubular sighting reticule in said casing, said reticule having a rearwardly directed face and a forwardly directed face adjacent its rear end, a spacer bar in said casing extending along the same over said reticule with its rear end in engagement with the forwardly directed surface thereon, a spring reacting between said casing and the rear face of said reticule to constantly urge said reticule against the rear end of said spacer bar, screw means passing through and into said casing to engage the forward end portion of said reticule to swing said reticule transversely in the casing upon the rear end of said spacer bar as a pivot, and means to secure said spacer bar to said casing.

2. In a telescope sight, a tubular casing, a tubular sighting reticule in said casing, said reticule having an annular flange about its rear end portion presenting a forwardly directed surface, a spacer bar in said casing extending along the same over said reticule with its rear end in engagement with the forwardly directed surface of said flange, a spring reacting between said casing and the rear end of said reticule to constantly urge said reticule flange against the rear end of said spacer bar, screw means passing through and into said casing at each side of said spacer bar, to engage the forward end portion of said reticule to swing it laterally upon the rear end of said spacer bar, and means to secure said spacer bar to said casing.

3. In a telescope sight, a tubular casing, a tubular sighting reticule in said casing, said reticule having an annular flange about its rear end portion presenting a forwardly directed surface, a spacer bar in said casing extending along the same over said reticule with its rear end in engagement with the forwardly directed surface of said flange, a spring reacting between said casing and the rear end of said reticule to constantly urge said reticule flange against the rear end of said spacer bar, screw means passing through and into said casing at each side of said spacer bar to engage the forward end portion of said reticule to swing it laterally upon the rear end of said spacer bar, said casing having an elongated slot therethrough, an adjusting plate carrying said screw means and overlying the elongated slot in said casing, and screw means extending through said plate and the slot in said casing to secure the plate and the spacer bar to said casing.

4. In a telescope sight, a tubular casing, a tubular sighting reticule disposed lengthwise in said casing, one end of said reticule having an annular flange extending laterally thereabout, and a lengthwise slot in said flange, a spacer bar attached to and disposed in said casing and having a tongue extending from an end thereof into the slot in said flange to retain said reticule against rotative movement in respect to said casing, the remainder of the end of said bar engaging said flange, a coiled spring reacting between said casing and the flanged end of said reticule to urge the flange against the end of said bar and to urge the reticule to rock on the engaging end of said bar laterally in said casing, and an adjusting screw passing through said casing and engaging a side of said reticule to control the rocking of said reticule by said spring.

5. In a telescope sight, a tubular casing, a tubular sighting reticule disposed lengthwise in said casing, one end of said reticule having an annular flange extending laterally thereabout, and a lengthwise slot in said flange, a spacer bar extending lengthwise in said casing and having a tongue extending from an end thereof into the slot in said flange to retain said reticule against rotative movement in respect to said casing, the remainder of the end of said bar engaging said flange, a coiled spring reacting between said casing and said reticule to urge said flange against the end of said bar and to urge said reticule to rock on the engaging end of said bar laterally in said casing, an adjusting screw passing through said casing and engaging a side of said reticule to control the rocking of the reticule on said bar end by said spring, and means connecting said adjusting screw to said spacer bar and to said casing for simultaneous adjustment lengthwise of said casing.

6. In a telescope sight, a tubular casing, a tubular sighting reticule disposed lengthwise in said casing, one end of said reticule having an annular flange extending laterally thereabout, and a lengthwise slot in said flange, a spacer bar extending lengthwise in said casing and having a tongue extending from an end thereof into the slot in said flange to retain said reticule against rotative movement in respect to said casing, the remainder of the end of said bar engaging said flange, a coiled spring reacting between said casing and said reticule to urge said flange against the end of said bar and to urge said reticule to rock on the engaging end of said bar laterally in said casing, an adjusting screw passing through said casing at each side of said spacer bar and engaging the other end of said reticule to control the rocking movement of said reticule on said bar end by said spring, a lengthwise elongated slot provided in said casing, a plate on the outer surface of said casing for supporting said screws, and means passing through the slot in said casing to connect said spacer bar to said plate, and to connect said bar and plate to said casing for adjustment lengthwise thereof.

7. In a telescope sight, a tubular casing, a tubular sighting reticule disposed lengthwise in said casing, one end of said reticule having an annular flange extending laterally thereabout, and a lengthwise slot in said flange, a spacer bar extending lengthwise in said casing and having a tongue extending from an end thereof into the slot in said flange to retain said reticule against rotative movement in respect to said casing, the remainder of the end of said bar engaging said flange at a portion thereof, a coiled spring reacting between said casing and said reticule to urge the engaged portion of said flange against said bar end and reacting against the remaining portion of said reticule to urge the reticule to rock on the engaging end of said bar laterally in said casing, an adjusting screw passing through said casing at each side of said spacer bar and engaging the other end of said reticule to control the lateral rocking movement of said reticule by said spring, a lengthwise elongated slot provided in said casing, a plate on the outer surface of said casing for supporting said screws, said bar having a portion extending upwardly into the slot in said casing to be guided thereby, and means passing through the slot in said casing to connect said spacer bar to said plate and to connect said bar and plate, to said casing for lengthwise adjustment of the reticule in respect to said casing.

8. In a telescope sight, a tubular casing having a rear end, a tubular sighting reticule in said casing, said reticule being disposed lengthwise in said casing and having a rear end rockingly engaging the inner periphery of said casing and having a rear end face, said reticule also having a forwardly directed face adjacent its rear end, a coiled spring reacting between the rear end face of said reticule and the rear end of said casing, said spring engaging the outer edge of the rear end face of said reticule at substantially equal pressure thereabout, and a bar extending lengthwise in and attached to said casing for sliding movement therein and having a rear end in engagement with a portion of the forwardly directed face on said reticule to hold the reticule against forward movement in said casing, and means attached to said casing and extending therethrough into engagement with the reticule forward of its rear end to limit the action of said spring on said reticule.

9. In a telescope sight, a tubular casing having a rear end, a tubular sighting reticule in said casing, said reticule being disposed lengthwise in said casing and having a rear end rockingly engaging the inner periphery of said casing and having a rear end face, said reticule also having a forwardly directed face adjacent its rear end, a coiled spring reacting between the rear end face of said reticule and the rear end of said casing, said spring engaging the outer edge of the rear end face of said reticule at substantially equal pressure thereabout, and a bar extending lengthwise in and attached to said casing for sliding movement therein and having a rear end in engagement with a portion of the forwardly directed face on said reticule to hold the reticule against forward movement in said casing, said casing having a lengthwise slot in its inner periphery, said bar having a portion disposed in the slot in said casing to be guided thereby during its sliding movement in said casing, and means attached to said casing and extending therethrough into engagement with the reticule forward of its rear end to limit the action of said spring on said reticule.

10. In a telescope sight, a tubular casing having a rear end, a tubular sighting reticule in said casing, said reticule being disposed lengthwise in said casing and having a rear end rockingly engaging the inner periphery of said casing and having a rear end face, said reticule also having a forwardly directed face adjacent its rear end, a coiled spring reacting between the rear end face of said reticule and the rear end of said casing, said spring engaging the outer edge of the rear end face of said reticule at substantially equal pressure thereabout, and a bar extending lengthwise in and attached to said casing for sliding movement therein and having a rear end in engagement with a portion of the forwardly directed face on said reticule to hold the reticule against forward movement in said casing, said casing having a lengthwise slot in its inner periphery said bar having a portion disposed in the slot in said casing to be guided thereby during its sliding movement in said casing, a tongue extending rearwardly from the rear end of said bar, said reticule having a slot therein to loosely receive said tongue whereby rotative movement of said reticule in said casing is limited, and means attached to said casing and extending therethrough into engagement with the reticule forward of its rear end to limit the action of said spring on said reticule.

EDWIN W. BULLARD.

REFERENCES CITED

The following references are of record in the file of this patent:

UNITED STATES PATENTS

| Number | Name | Date |
| --- | --- | --- |
| 2,064,329 | Weaver | Dec. 15, 1936 |
| 2,094,623 | Stokey | Oct. 5, 1937 |
| 2,150,629 | Mossberg | Mar. 14, 1939 |
| 2,155,389 | Arden | Apr. 25, 1939 |
| 2,155,390 | Arden | Apr. 25, 1939 |
| 2,180,184 | Weaver | Nov. 14, 1939 |
| 2,189,766 | Unertl | Feb. 13, 1940 |